United States Patent
Iwasa et al.

(10) Patent No.: US 9,086,537 B2
(45) Date of Patent: Jul. 21, 2015

(54) LAMINATED DIFFRACTIVE OPTICAL ELEMENT

(75) Inventors: Hidefumi Iwasa, Yokohama (JP); Hideo Ukuda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 161 days.

(21) Appl. No.: 13/884,047

(22) PCT Filed: Nov. 8, 2011

(86) PCT No.: PCT/JP2011/076133
§ 371 (c)(1),
(2), (4) Date: May 8, 2013

(87) PCT Pub. No.: WO2012/067050
PCT Pub. Date: May 24, 2012

(65) Prior Publication Data
US 2013/0235460 A1    Sep. 12, 2013

(30) Foreign Application Priority Data
Nov. 17, 2010    (JP) .................... 2010-257147

(51) Int. Cl.
*G02B 5/18*    (2006.01)
*G02B 27/00*    (2006.01)

(52) U.S. Cl.
CPC ............ *G02B 5/1866* (2013.01); *G02B 5/1852* (2013.01); *G02B 5/1876* (2013.01); *G02B 27/0037* (2013.01)

(58) Field of Classification Search
CPC .. G02B 5/1814; G02B 5/1819; G02B 5/1823; G02B 5/1842; G02B 5/1866; G02B 5/1876; G02B 5/188; G02B 27/0037
USPC .......... 359/558, 566, 569, 571, 576, 742, 743
See application file for complete search history.

(56) References Cited

U.S. PATENT DOCUMENTS

| 6,394,613 | B1 | 5/2002 | Hatakeyama et al. |
| 6,912,092 | B2 | 6/2005 | Ukuda |

(Continued)

FOREIGN PATENT DOCUMENTS

| JP | 09-127321 A | 5/1997 |
| JP | 2004-145273 A | 5/2004 |
| JP | 2008-242391 A | 10/2008 |
| JP | 2009-197217 A | 9/2009 |

OTHER PUBLICATIONS

Feb. 17, 2012 International Search Report and Written Opinion in International Patent Appln. No. PCT/JP2011/076133.

(Continued)

*Primary Examiner* — Stephone B Allen
*Assistant Examiner* — Kimberly N Kakalec
(74) *Attorney, Agent, or Firm* — Fitzpatrick, Cella, Harper & Scinto

(57) ABSTRACT

A laminated diffractive optical element including a colorant-containing first layer having a diffraction grating surface with a grating height X and a second layer closely stacked on the diffraction grating surface of the first layer, wherein the relation of internal transmittances $T_{\lambda, a}$ and $T_{\lambda, b}$ of a material (a) for forming the first layer and a material (b) for forming the second layer satisfies the following (Formula 1) and the relation of the maximum and minimum internal transmittances $T_{\lambda, MAX}$ and $T_{\lambda, MIN}$ of the laminated diffractive optical element satisfies the following Formula (2):

$$2.0\% \leq |T_{\lambda, a} - T_{\lambda, b}| \quad \text{(Formula 1)}$$

$$T_{\lambda, MAX} - T_{\lambda, MIN} \leq 8.0\% \quad \text{(Formula 2)}$$

This reduces shading on the image surface resulting from the difference in transmittance of the optical element to provide a laminated diffractive optical element having reduced variation in transmittance.

12 Claims, 7 Drawing Sheets

(56) References Cited

U.S. PATENT DOCUMENTS

| | | |
|---|---|---|
| 7,031,078 B2 | 4/2006 | Ukuda |
| 7,663,803 B2 | 2/2010 | Ukuda et al. |
| 8,120,851 B2 | 2/2012 | Iwasa |
| 8,124,324 B2 | 2/2012 | Iwasa |
| 8,344,094 B2 | 1/2013 | Iwasa et al. |
| 2004/0104379 A1 | 6/2004 | Ukuda |
| 2008/0174871 A1 | 7/2008 | Ukuda et al. |
| 2009/0190224 A1 | 7/2009 | Iwasa |
| 2010/0076138 A1 | 3/2010 | Iwasa |
| 2010/0190884 A1* | 7/2010 | Gillard et al. .................. 523/122 |

OTHER PUBLICATIONS

May 30, 2013 International Preliminary Report on Patentability in International Patent Appln. No. PCT/JP2011/076133.

* cited by examiner

TOP VIEW

CROSS-SECTIONAL VIEW

IRRADIATE WITH HIGH-PRESSURE MERCURY LAMP

IRRADIATE WITH HIGH-PRESSURE MERCURY LAMP

LAMINATED DIFFRACTIVE OPTICAL ELEMENT

TECHNICAL FIELD

The present invention relates to a laminated diffractive optical element and an optical system, and more particularly to a laminated diffractive optical element used for an imaging optical system such as a camera.

BACKGROUND ART

In a conventional refracting optical system using refraction of light, chromatic aberration is reduced by a combination of lenses made of glass materials having different dispersion characteristics. For example, an object lens of a telescope employs a combination of a positive lens made of low-dispersion glass and a negative lens of high-dispersion glass to correct chromatic aberration arising on the axis. However, it has been difficult to correct chromatic aberration sufficiently in the case where the configuration or number of lenses is limited or in the case where glass materials for use are limited.

Accordingly, it is known that chromatic aberration can be inhibited with a small number of lenses when a refractive optical element having a refractive surface and a diffractive optical element having a diffraction grating are used in combination. This makes use of the physical phenomenon that the direction of chromatic aberration arising for a light beam with a reference wavelength is reversed between a refractive surface and a diffractive surface of optical elements. In addition, by changing the period of diffractive gratings formed successively on a diffractive optical element, properties equal to those of an aspheric lens may be achieved.

However, a light beam incident to a diffractive optical element is divided into multiple light beams having different orders by diffraction. On this occasion, diffracted light beams having orders other than the design order form images at sites different from the site where the light beam having the design order forms the image, causing flare.

Accordingly, Patent Literature 1 discloses that optimization of the refractive index dispersion of each optical element and the shape of a grating formed on the boundary surface of optical elements enables high diffraction efficiency in a wide range of wavelength. By concentrating luminous flux in the range of wavelength for use into a specified order (hereinafter referred to as design order), the intensity of diffracted light having diffractive orders other than the design order is suppressed to a low level, resulting in flare being inhibited.

Specifically, BMS81 (nd=1.64, vd=60.1: manufactured by Ohara Inc.) and plastic optical material PC (nd=1.58, vd=30.5: manufactured by Teijin Chemicals Ltd.) are used in Patent Literature 1. Alternatively, COO1 (nd=1.5250, vd=50.8: manufactured by DIC Corporation), plastic optical material PC (nd=1.58, vd=30.5: manufactured by Teijin Chemicals Ltd.), and BMS81 (nd=1.64, vd=60.1: manufactured by Ohara Inc.) are used in Patent Literature 2.

Abbe number (vd) is calculated from the following Formula (3):

$$vd=(nd-1)/(nF-nC) \quad \text{Formula (3)}$$

(wherein nd represents refractive index at the d-line (587.6 nm), nF represents refractive index at the F-line (486.1 nm), and nC represents refractive index at the C-line (656.3 nm)).

The present inventors examined available or known optical materials of the diffractive optical elements and found the distributions shown in FIGS. 8A and 8B. FIG. 8A is a graph illustrating the distribution of Abbe numbers and refractive indices of general optical materials. FIG. 8B is a graph illustrating the distribution of Abbe numbers and secondary dispersion characteristics (θg, F) of general optical materials. The materials for the laminated diffractive optical element described in Patent Literature 1 are present also within the distributions in FIGS. 8A and 8B.

Patent Literature 1 also discloses use in combination of a diffractive optical element formed from a material having a relatively low refractive index dispersion and a diffractive optical element formed from a material having a high refractive index dispersion in order to achieve a configuration having high diffraction efficiency in a wide range of wavelength. The greater the difference in refractive index dispersion between materials having high and low refractive index dispersions, the higher diffraction efficiency and the wider field angle of an optical element formed therefrom are achieved. Accordingly, use of a material having a higher refractive index dispersion (or a small Abbe number) and a material having a lower refractive index dispersion (or a large Abbe number) is required for high-precision chromatic aberration correction.

Patent Literature 2 discloses an optical material having the relationship between refractive index (nd) and Abbe number (vd) represented by nd>−6.667×10$^{-3}$vd+1.70, and the relationship between the secondary dispersion characteristic of the refractive index (θg, F) and Abbe number (vd) represented by θg, F≤−2vd×10$^{-3}$+0.59. According to the disclosure, diffraction efficiency in the entire visible region is enhanced by satisfying these formulas.

Secondary dispersion characteristic (θg, F) is calculated from the following Formula (4):

$$\theta g, F=(ng-nF)/(nF-nC) \quad \text{Formula (4)}$$

(wherein ng represents refractive index at the g-line (435.8 nm), nF represents refractive index at the F-line (486.1 nm), and nC represents refractive index at the C-line (656.3 nm)).

Patent Literature 3 discloses use in combination of diffractive optical elements formed from a material having a high refractive index dispersion containing metal oxide fine particles such as ITO and a material having a low refractive index dispersion containing metal oxide fine particles such as $ZrO_2$.

CITATION LIST

Patent Literature

PTL 1: Japanese Patent Application Laid-Open No. H09-127321
PTL 2: Japanese Patent Application Laid-Open No. 2004-145273
PTL 3: Japanese Patent Application Laid-Open No. 2009-197217

In order to enhance diffractive efficiency in the entire visible region as described above, Patent Literature 3 discloses an example of use of a material having a high refractive index dispersion containing metal oxide fine particles such as ITO and a transparent material having a low refractive index dispersion.

FIG. 7 is a schematic view illustrating internal transmittance of an optical element. In FIG. 7, a diffractive optical element formed from a material 102 that is transparent in the visible light region and a diffractive optical element formed from a material 103 that has high absorption in the visible light region are stacked and form a closely-attached two-layer diffractive optical element 101. P1 represents base thickness of the diffractive optical element formed from the material 102, P2 represents base thickness of the diffractive optical element formed from the material 103, and X represents grating height.

The metal oxides described in Patent Literature 3 have high absorption in the visible light region. Accordingly, a large difference in internal transmittance of the optical element partly arises between the sites where a light beam passes through. More specifically, a light beam 1 passes through a layer of the material 103 having a thickness P2 and a layer of the material 102 having a thickness (X+P1). As a result, inner transmittance 1 of the light beam 1 is the highest in the diffractive optical element 101. In contrast, a light beam 2 passes through a layer of the material 103 having a thickness (X+P2) and a layer of the material 102 having a thickness P1. As a result, inner transmittance 2 of the light beam 2 is the lowest in the diffractive optical element 101. Consequently, when light beams form an image on a surface after passing through the diffractive optical element, shading resulting from the difference in transmittance of the optical element is produced on the image surface.

SUMMARY OF INVENTION

In view of the background art, the present invention provides a laminated diffractive optical element having reduced variation in transmittance and an optical system using the same by reducing shading on the image surface resulting from the difference in transmittance of the optical element.

The laminated diffractive optical element for solving the problem includes a colorant-containing first layer having a diffraction grating surface with a grating height X and a second layer closely stacked on the diffraction grating surface of the first layer, wherein when the first layer formed from a material (a) with a thickness X has an internal transmittance $T_{\lambda, a}$ for a light beam with a wavelength $\lambda$, the second layer formed from a material (b) with a thickness X has an internal transmittance $T_{\lambda, b}$ for a light beam with a wavelength $\lambda$, the laminated diffractive optical element has an internal transmittance $T_{\lambda, MAX}$ at a part where the transmittance reaches a maximum for a light beam with a wavelength $\lambda$, and the laminated diffractive optical element has an internal transmittance $T_{\lambda, MIN}$ at a part where the transmittance reaches a minimum for a light beam with a wavelength $\lambda$, the following (Formula 1) and (Formula 2) are satisfied:

$$2.0\% \leq |T_{\lambda, a} - T_{\lambda, b}| \quad \text{(Formula 1)}$$

$$T_{\lambda, MAX} - T_{\lambda, MIN} \leq 8.0\% \quad \text{(Formula 2)}$$

(wherein grating height X: 0.01 µm≤X≤100 µm, and wavelength $\lambda$: 450 nm≤$\lambda$≤650 nm).

Further features of the present invention will become apparent from the following description of exemplary embodiments with reference to the attached drawings.

DESCRIPTION OF EMBODIMENTS

Preferred embodiments of the present invention are described as follows.

Figure 7:
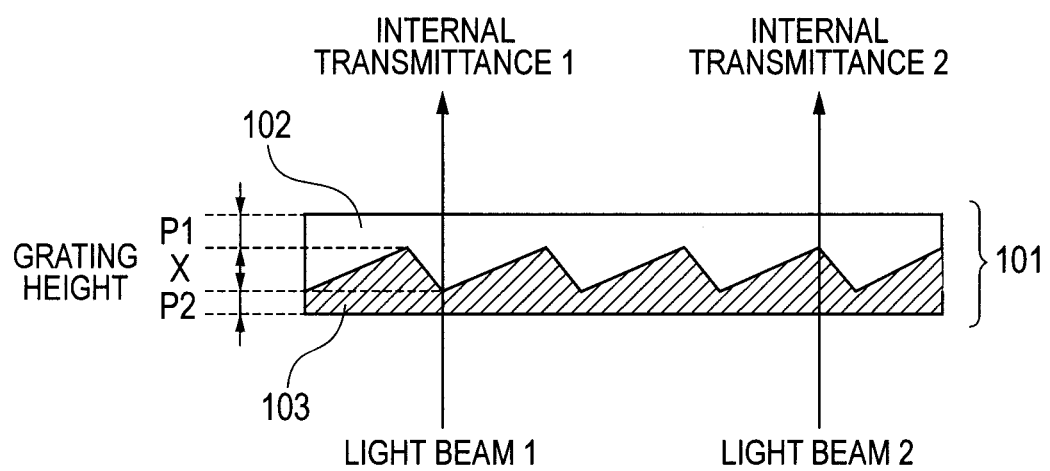
FIG. 7 is a schematic view illustrating internal transmittance in an optical element.
Figure 8A:
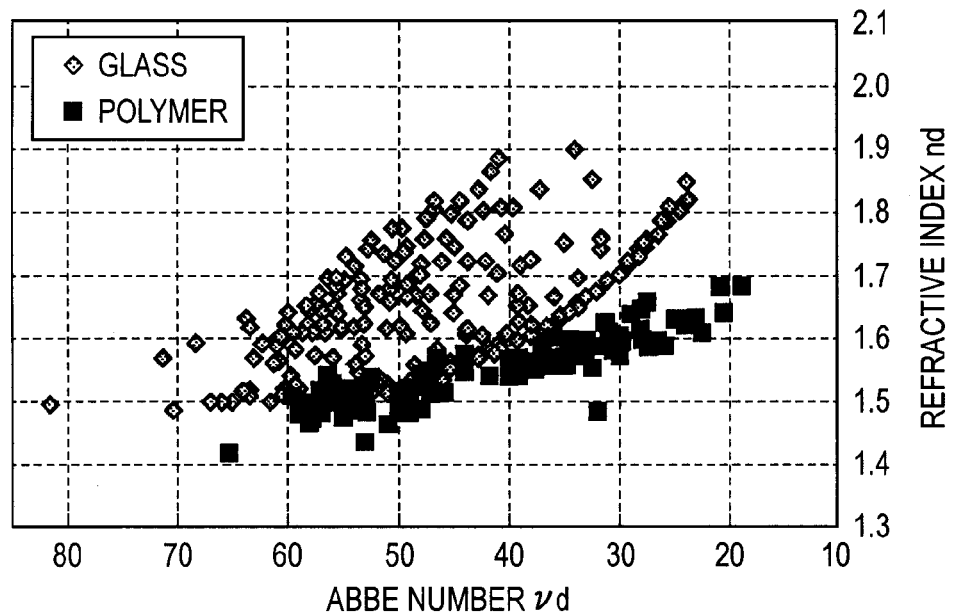
FIGS. 8A, and 8B are graphs illustrating the distribution of Abbe numbers and refractive indices and the distribution of Abbe numbers and secondary dispersion characteristics of general optical materials.
Figure 8B:
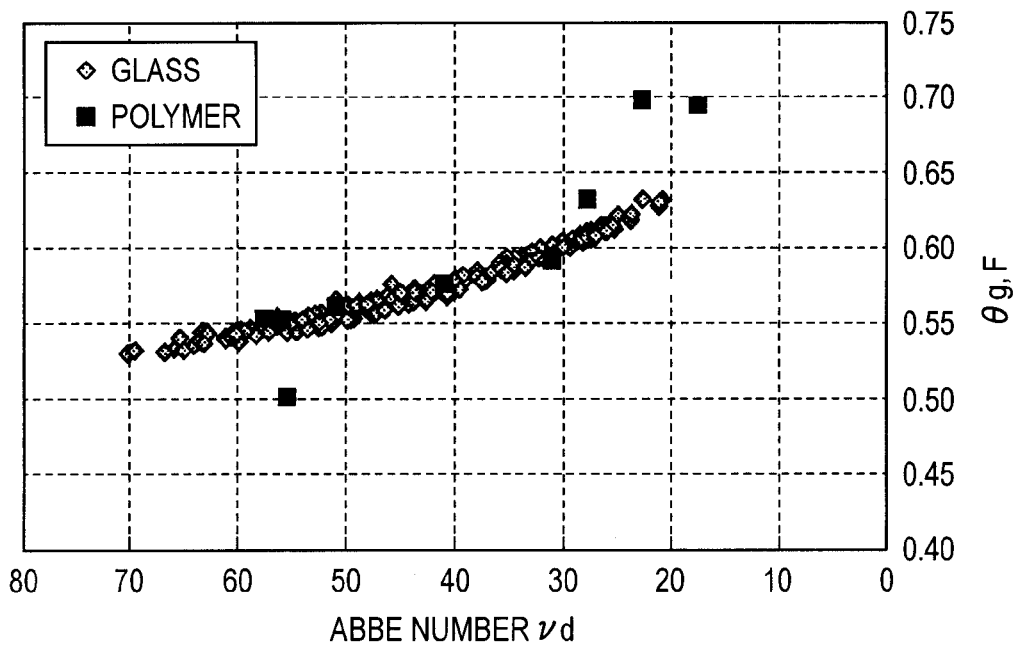

In order to inhibit the variation in transmittance of a closely attached two-layer diffractive optical element, it is effective to reduce the difference in transmittance between the material 102 that is transparent in the visible light region and the material 103 that has high absorption in the visible light region in FIG. 7. However, it is difficult to enhance transmittance of the material 103 that has high absorption in the visible light region, because metal oxide fine particles are dispersed for satisfying characteristics of refractive index and Abbe number. As a result of extensive investigation by the present inventor, variation in transmittance is reduced by imparting a colorant to the material 102 that is transparent in the visible light region and thus reducing the transmittance purposely, while the transmittance of the diffractive optical element 101 (laminated diffractive optical element) is kept within a required range.

A laminated diffractive optical element of the present invention includes a colorant-containing first layer having a diffraction grating surface with a grating height X and a second layer closely stacked on the diffraction grating surface of the first layer, wherein when the first layer formed from a material (a) and the second layer formed from a material (b) have internal transmittances $T_{\lambda, a}$ and $T_{\lambda, b}$, respectively (wherein the internal transmittance is for a light beam with at least a wavelength $\lambda$ within the range of 450 nm≤$\lambda$≤650 nm), the relation thereof satisfies the following (Formula 1) and the relation of the internal transmittances $T_{\lambda, MAX}$ and $T_{\lambda, MIN}$ satisfies the following Formula (2):

$$2.0\% \leq |T_{\lambda, a} - T_{\lambda, b}| \quad \text{(Formula 1)}$$

$$T_{\lambda, MAX} - T_{\lambda, MIN} \leq 8.0\% \quad \text{(Formula 2)}$$

(wherein a grating height X is expressed by 0.01 µm X≤100 µm, a wavelength $\lambda$ is expressed by 450 nm≤$\lambda$≤650 nm, $T_{\lambda, a}$ represents internal transmittance (%) of a material (a) with a thickness X for a light beam with a wavelength $\lambda$, $T_{\lambda, b}$ represents internal transmittance (%) of a material (b) with a thickness X for a light beam with a wavelength $\lambda$, $T_{\lambda, MAX}$ represents internal transmittance (%) of the laminated diffractive optical element at a part where the transmittance reaches a maximum for a light beam with a wavelength $\lambda$, and $T_{\lambda, MIN}$ represents internal transmittance (%) of the laminated diffractive optical element at a part where the transmittance reaches a minimum for a light beam with a wavelength $\lambda$).

The internal transmittance $T_{\lambda, MAX}$ corresponds to an internal transmittance of 1 in FIG. 7, while the internal transmittance $T_{\lambda, MIN}$ corresponds to an internal transmittance of 2.

Formula 1 described above defines the difference between $T_{\lambda, a}$ and $T_{\lambda, b}$. The problem to be solved by the present invention that shading resulting from the difference in internal transmittance of the optical element is produced on the image surface is caused by the difference in transmittance between the materials (a) and (b). The problem to be solved by the present invention is not caused when the difference in transmittance between the materials (a) and (b) is less than 2%. Accordingly, Formula 1 defines the scope in which the present invention solves the problem. Formula 2 described above defines the difference between $T_{\lambda, MAX}$ and $T_{\lambda, MIN}$. Shading resulting from the difference in internal transmittance of the optical element is produced on the image surface when the difference between $T_{\lambda, MAX}$ and $T_{\lambda, MIN}$ exceeds 8%, Accordingly, the scope is defined within less than 8%.

In the present invention, the material (a) for forming the first layer and the material (b) for forming the second layer are used as optical materials of which the transmittance is controlled in the visible light region with a wavelength from 450 nm to 650 nm. Accordingly, when light beams pass through the laminated diffractive optical element and form an image on a surface, the difference in transmittance depending on the grating shape may be further reduced on the image surface. As a result, when the laminated diffractive optical element is installed on an optical system such as an imaging system or a projection system, an image (pictorial image) that is less influenced by the grating shape may be produced. This phenomenon is more prominent for an optical system having the laminated diffractive optical element installed closer to the image surface, such as an imaging system having a short focal length.

A typical configuration of a laminated diffractive optical element of the present invention is described with reference to FIGS. 1A and 1B.

(Laminated Diffractive Optical Element)

Figure 1A:
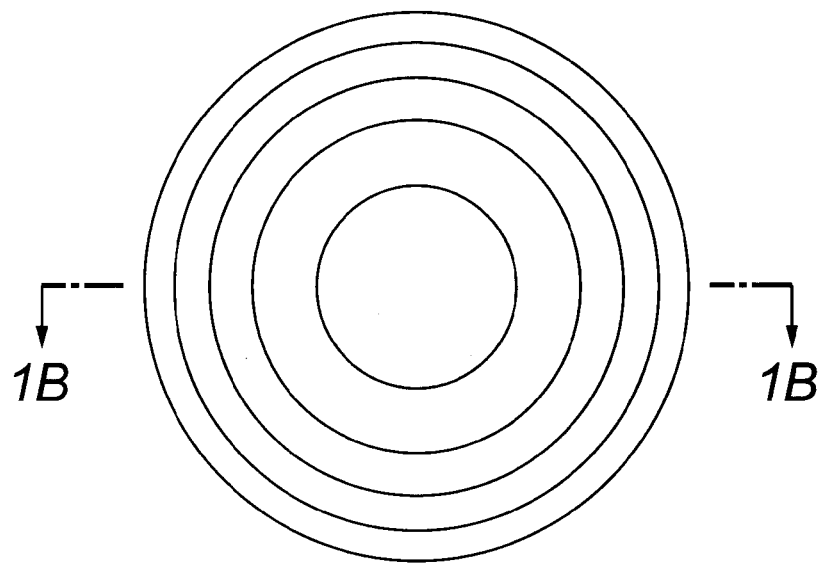
FIGS. 1A and 1B are schematic views illustrating an embodiment of a laminated diffractive optical element of the present invention.
Figure 1B:
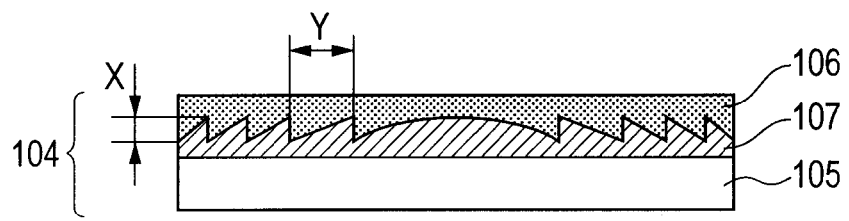

FIGS. 1A and 1B are schematic views illustrating an embodiment of a laminated diffractive optical element of the present invention. FIG. 1A is a top view and FIG. 1B is a cross-sectional view taken from line A-A. A laminated diffractive optical element 104 of the present invention has a closely stacked structure having no interspace, including a first layer 106 having high refractive index and low dispersion characteristics including a colorant-containing material (a) having a diffraction grating surface with a grating height X formed on a transparent substrate layer 105 made of glass or plastic, and a second layer 107 having low refractive index and high dispersion characteristics including a material (b) stacked on the diffractive grating surface of the first layer 106.

The sequence of stacking the first layer 106 having high refractive index and low dispersion characteristics including the material (a) and the second layer 107 having low refractive index and high dispersion characteristics including the material (b) may be reversed. Both sides of the transparent substrate layer 105 may be planar, spherical, or aspherical. The layered product of the first layer 106 having high refractive index and low dispersion characteristics and the second layer 107 having low refractive index and high dispersion characteristics may be sandwiched between transparent substrate layers.

In order to enhance diffraction efficiency of the optical element, it is preferred that refractive index at the d-line (nd1) of the first layer 106 having high refractive index and low dispersion characteristics be larger than refractive index at the d-line (nd2) of the second layer 107 having low refractive index and high dispersion characteristics, and Abbe number (vd2) of the second layer 107 having low refractive index and high dispersion characteristics be smaller than Abbe number (vd1) of the first layer 106 having high refractive index and low dispersion characteristics.

A laminated diffractive optical element of the present invention has a diffraction grating surface with a grating height X expressed by 0.01 μm≤X≤100 μm, preferably 1 μm≤X≤30 μm, a pitch Y of 1 μm or more and 2000 μm or less, preferably 10 μm or more and 1000 μm or less, and a surface roughness Ra of 0.01 nm or more and 100 nm or less.

Formula 1 described above is as follows: $2.0\% \leq |T_{\lambda, a} - T_{\lambda, b}|$.

Formula 2 described above is as follows: $T_{\lambda, MAX} - T_{\lambda, MIN} \leq 8.0\%$, preferably $T_{\lambda, MAX} - T_{\lambda, MIN} \leq 5.0\%$.

The material (a) and the material (b) of the present invention may be resins, organic-inorganic composites, or inorganic material such as glass. Both or either one of the material (a) and the material (b) of the present invention includes an organic-inorganic composite containing at least a resin and metal oxide fine particles.

(Colorant)

Preferably, the material (a) for the first layer of the present invention contains a colorant. The material (b) for the second layer may or may not contain a colorant. Preferably, the colorant is at least one selected from the group consisting of dye compounds and pigments regardless of an organic or inorganic component. The dye compounds and pigments having absorption in the visible light region are contained in one of resins, organic-inorganic composites, and inorganic materials and thus develop colors.

The colorant content is in the range from 0.001 wt % to 10.0 wt %, preferably from 0.01 wt % to 5.0 wt % relative to resins, organic-inorganic composites, or inorganic materials. A content of less than 0.001 wt % is insufficient for coloring, resulting in a large difference in transmittance between the materials. A content of more than 10.0 wt % results in also a large difference in transmittance between the materials. The colorant content needs to be adjusted depending on the transmittance of the corresponding material. Even though the difference in transmittance is small between the materials, it is not preferred for an optical system to have a reduced absolute transmittance of a laminated diffractive optical element formed from the materials. Accordingly, the colorant content can be adjusted at a low level.

Each of black, blue, yellow, and red dye compounds may be used as the dye compound, and preferably the respective dye compound contents are adjusted for a required color. More specifically, examples include Yellow G, Yellow 2G, Yellow GN, Yellow A-G, Yellow E-G, Yellow E-AR, Orange G, Orange A-N, Red G, Red 130, Red B, Red A-G, Red A-2G, Red A-BR, Red E-CG, Red E-BG, Violet A-R, Blue N, A-2R, Blue A-D, Blue A-CR, Green A-B, Black G, Black B, Black A-B, of KAYASET series, and B, OS, and OSN of KAYAlight series manufactured by Nippon Kayaku Co., Ltd., Yellow FL7G, Yellow GC, Yellow R, Yellow HLR, Lemon Yellow HGN, Lemon Yellow HL, Orange HRP, Red AS, Red B-2, Red FB, Red 3B, Red HF4G, Red HFG, Red H3G, Red H4GR, Red HL2B, Red HL5B, Violet RR, Violet B, Blue OR, Blue SR, Blue GP, Blue S, Blue OA, Turq Blue G, Green G, Bordeaux HBL, Black G-2, Black H3B, Black HLG, Black HB, and Black A-H, Black A-N, Green A-B, SDO-7, SDO-13, SDO-45, of Sumiplast series manufactured by Sumika Chemtex Co., Ltd., and Daicolor dry, Daicolor granulated, Daicolor master, Concpet, HMC series, PK-, PL-, PT-, PB-, PA-, HS-, Discoall-VTM, EM, VT, PMP, TFM, FCM, FCT, TFD, MA-, AT, Resamine-CP, Earthly master, ST, ET, and FT manufactured by Dainichiseika Color and Chemicals Mfg. Co., Ltd.

Each of black, blue, yellow, and red pigments may be used as the pigment, and preferably the respective pigment contents are adjusted to produce a required color. More specifically, examples include Chromofine, Seikafast, Seikalight, Daipyroxide, Prussian Blue, Milori Blue, Daipromenade, NAF, FPGK, FPGS, UTC-O, AF, MF, IF, Rubcouleur, RML, RGP, TB, DP, EP, AM, Seikaseven, and Dymic manufactured by Dainichiseika Color and Chemicals Mfg. Co., Ltd., $Al_2O_3$, $Bi_2O_3$, $CeO_2$, CoO, $Fe_2O_3$ ($\alpha$), $Fe_2O_3$ ($\gamma$), $Ho_2O_3$, ITO, $In_2O_3$, $Mn_3O_4$, $SiO_2$, $SnO_2$, $TiO_2$, $Y_2O_3$, ZnO, $ZrO_2$, Black, and Cobalt Blue of NanoTek series manufactured by C. I. Kasei Co., Ltd.

Colorants used for the present invention are not limited to the colorants specifically described above, and organic and inorganic ion colorants may be used if resins or glass can be colored thereby. The dye compounds and the pigments may be used each singly or in mixtures of them as colorants. Preferably the colorants have high resistance to light such as ultraviolet rays. A colorant having low resistance to light introduces time-elapsed change in color or color fading depending on use environment. In the case where colorants are contained in a resin, the colorants need to be dissolved in the resin for use or uniformly dispersed having a size smaller than the wavelength. The reason is that the presence of insoluble matters or aggregates may cause scattering or variation in transmittance.

(Resins)

The resins used for the material (a) and the material (b) of the present invention may be one of monomers, oligomers, or polymers, or blended mixtures thereof. Examples of the resin components include acrylic, methacryl, epoxy, and cycloolefin resins, but not specifically limited thereto.

In the case where one of a light curing and a thermosetting resin is used as the resin, the resin having unsaturated functional groups enables forming into a desired shape with a mold. On this occasion, an active energy (light or heat) polymerization initiator may be added to the material composition, resulting in an energy-curing resin that is a solvent-free system having excellent processability.

Although the content of the active energy polymerization initiator depends on the kind of resin and contents of dye compounds and pigments having absorption in the visible light region, preferably the content is selected in the range of 0.01 wt % or more and 10.00 wt % or less relative to the resin components. Specifically, photopolymerization initiators may be used only singly or in mixtures of two or more depending on reactivity of the resin components and wavelength of the exposed light.

In the case where a thermoplastic resin is used as the resin, the resin needs not to have unsaturated functional groups, and may be used singly or in mixtures with one of the photocurable resin and the thermosetting resin.

Mold lubricants, flame retardants, UV absorbers, infrared absorbers, oxidation inhibitors, sensitizers, and thickeners may be added to the resin, as required. (Metal oxide fine particles)

Both or either one of the material (a) and the material (b) of the present invention includes an organic-inorganic composite containing at least a resin and metal oxide fine particles.

Preferably the metal oxide fine particles contained in the material of the present invention is selected at least from the group consisting of tin-doped indium oxide (ITO), antimony-doped tin oxide (ATO), zinc-doped indium oxide (IZO), aluminum-doped zinc oxide (AZO), and fluorine-doped tin oxide (FTO). These metal oxide fine particles may be used singly or in combinations of several kinds. Compound oxide fine particles including Si, Ti, Sn, or Zr may be used, as required.

Preferably the metal oxide fine particles have an average primary particle diameter in the range of 2 nm or more and 30 nm or less, more preferably in the range of 2 nm or more and 25 nm or less. An excessively large average primary particle diameter causes scattering. Scattering may be inhibited by surface-treating the metal oxide fine particles with one of surface-treating agents and dispersants as required for enhancing uniform dispersion. The effective surface-treating agents and dispersants include cationic, weak cationic, non-ionic, and ampholytic surface active agents.

The content of the metal oxide fine particles is in the range of 0.5 vol % or more and 40 vol % or less relative to the resin, preferably in the range of 0.5 vol % or more and 25 vol % or less. An excessive content results in high scattering due to aggregation of the fine particles. In addition, since the metal oxide fine particles have absorption in the visible light region, the absolute transmittance of an optical element is reduced as the content increases, which is not desirable for an optical system.

An optical system of the present invention features having the laminated diffractive optical element described above. The optical system includes a projection optical system and an imaging optical system.

Specific examples of the imaging system that uses the laminated diffractive optical element of the present invention include a wide-angle lens having a short focal length.

EXAMPLES

The preferred examples of the present invention are described below.

Example 1

A material (a) for forming a first layer having high refractive index and low dispersion characteristics and a material (b) for forming a second layer having low refractive index and high dispersion characteristics were manufactured as follows.

[A Method for Manufacturing the Material (a) for Forming a Layer having High Refractive Index and Low Dispersion Characteristics]

$ZrO_2$ fine particles having an average primary particle diameter of 3 nm were dispersed using a surface-treating agent and toluene solvent to prepare slurry of 10 wt % $ZrO_2$ fine particles. A photocurable acrylic resin was prepared as a resin. Sumipast Black HB and SDO-13 manufactured by Sumika Chemtex Co., Ltd. were prepared as colorants.

The slurry was compounded into 22.6 vol % $ZrO_2$ fine particles relative to the resin volume, blended, and compatibly dissolved. Subsequently, the colorants were compounded into 0.21 wt % Sumipast Black HB and 0.26 wt % SDO-13 relative to the total weight of the resin and the $ZrO_2$ fine particles, blended, and compatibly dissolved. Subsequently, toluene solvent was removed under reduced pressure to produce the material (a) 201 for forming a layer having high refractive index and low dispersion characteristics. [A Method for Manufacturing the Material (b) for Forming a Layer having a Low Refractive Index and a High Dispersion Characteristics]

ITO fine particles having an average primary particle diameter of 10 nm were dispersed using a surface-treating agent and xylene solvent to prepare slurry of 10 vol % ITO fine particles. A photocurable fluorine-containing acrylic resin was prepared as a resin.

The slurry was compounded into 25.0 vol % ITO fine particles relative to the resin volume, blended, and compatibly dissolved. Subsequently, xylene solvent was removed under reduced pressure to produce the material (b) 301 for forming a layer having low refractive index and high dispersion characteristics.

The average primary particle diameter of fine particles was measured with a laser-type particle size analyzer (ELS manufactured by Otsuka Electronics Co., Ltd.).

[Manufacturing of a Laminated Diffractive Optical Element]

A method for manufacturing a laminated diffractive optical element is described below.

Figure 2:
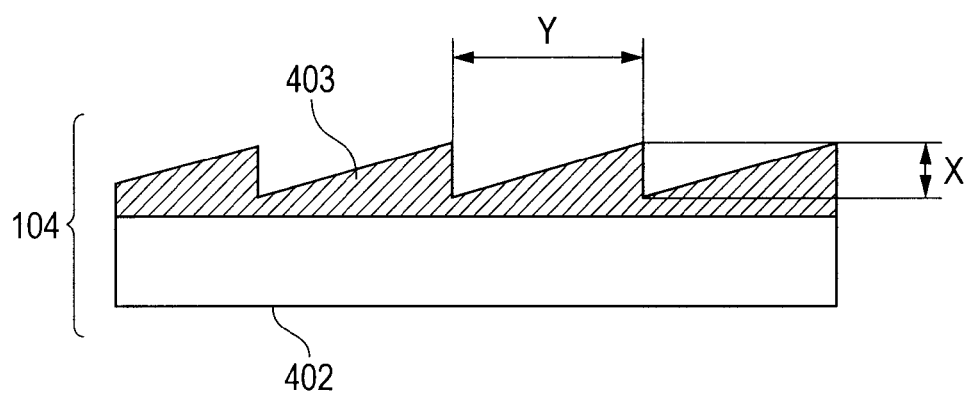
FIG. 2 is a schematic view illustrating a cross-section of a mold for decal transferring of a shape of diffractive grating structure.

FIG. 2 is an enlarged schematic view illustrating a part of cross-section of a mold 401 for decal transferring of a desired shape of diffractive grating structure. The mold 401 includes a mold base material layer 402 as the foundation layer and a plated layer 403 having a diffractive grating shape as the upper layer. The shape of the plated layer 403 was designed to have a grating height X of 7.01 μm, a pitch Y of 80 μm, and a surface roughness Ra of not exceeding 2 nm. [0062]The grating height was designed based on refractive index characteristics of the materials (a) 201 and (b) 301 so that diffractive efficiency achieved 99.8% or more in the entire wavelength range from 450 nm to 650 nm.

The grating shape was observed with a non-contact 3D surface profile and roughness measuring instrument (New View 5000 manufactured by Zygo Corporation).

Figure 3A:
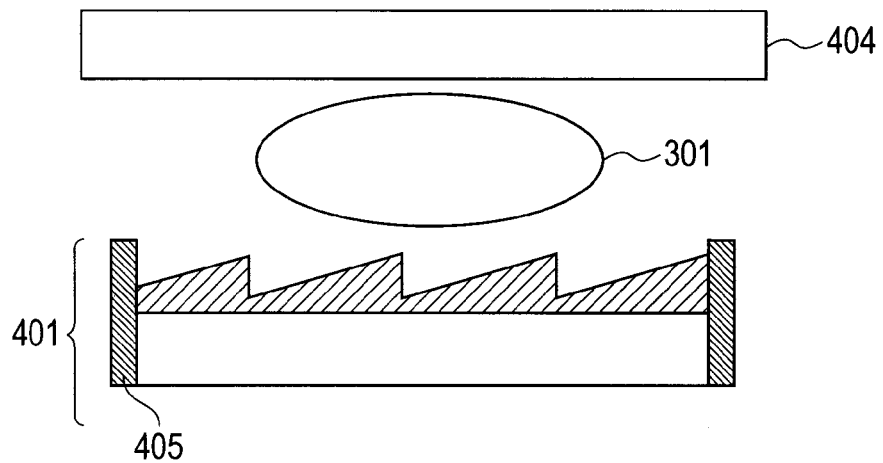
FIGS. 3A, 3B, and 3C are process charts illustrating a method for manufacturing a laminated diffractive optical element.
Figure 3B:
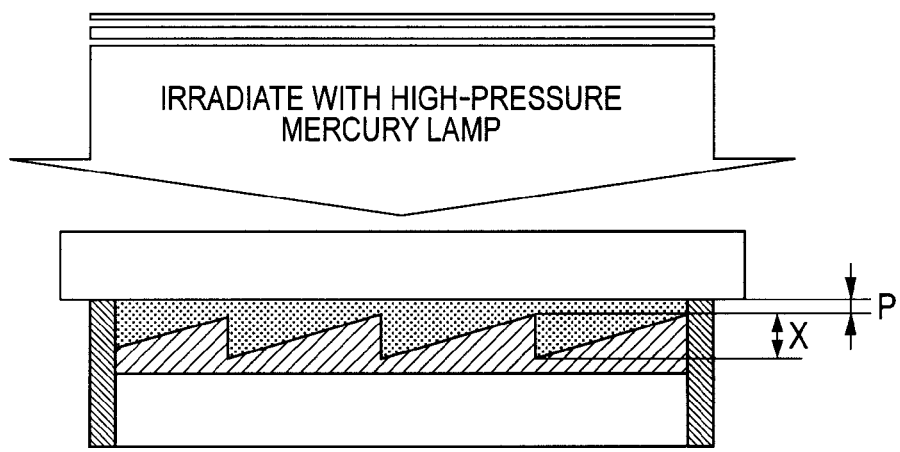
Figure 3C:
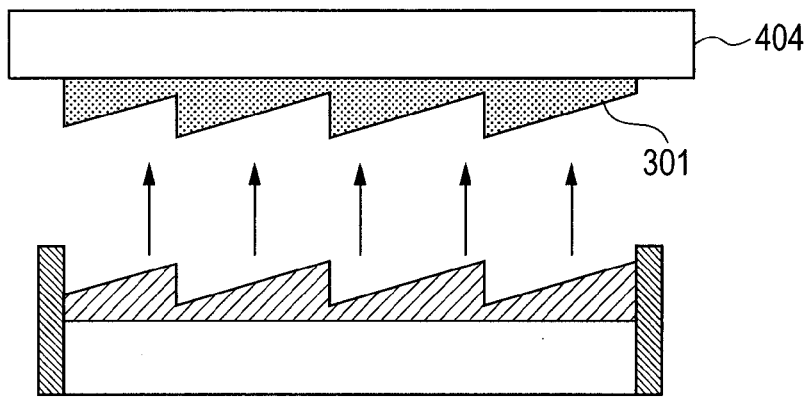

As illustrated in FIG. 3A, the material (b) 301 was dripped onto the mold 401, covered with a glass substrate 404 thereon, and flattened out so that the thickness other than height X of the grating shape (base thickness P) attained 2 μm using a spacer 405. Subsequently, as illustrated in FIG. 3B, the material (b) 301 was cured with irradiation with a high-pressure mercury lamp (EXECURE250 manufactured by HOYA CANDEO OPTRONICS Corporation) from above the glass substrate 404 under conditions of 20 mW/cm² for 1000 sec. After curing, as illustrated in FIG. 3C, the material (b) 301 integrated with the glass substrate 404 was released from the mold.

Figure 4A:
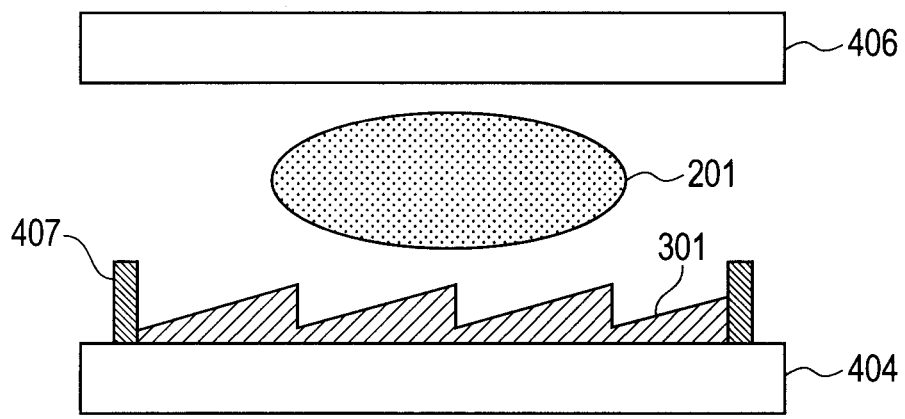
FIGS. 4A, 4B, and 4C are process charts illustrating a method for manufacturing a laminated diffractive optical element.
Figure 4B:
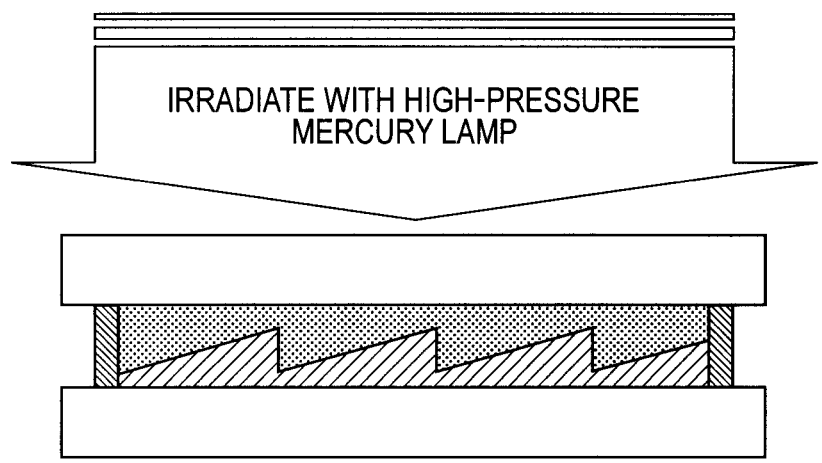
Figure 4C:
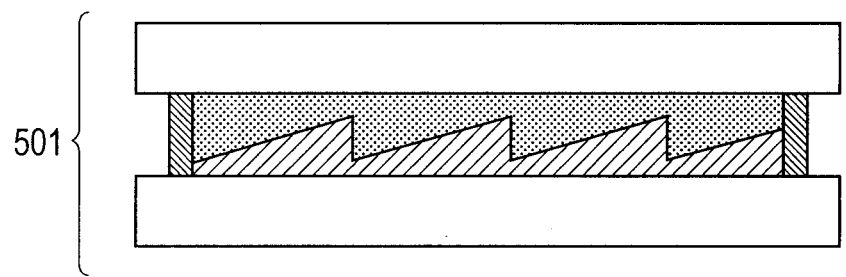

As illustrated in FIG. 4A, the material (a) 201 was dripped onto the surface of the side of the material (b) 301 integrated with the glass substrate 404 produced as described above, covered with a glass substrate 406 thereon, and flattened out so that the base thickness P attained 2 μm using a spacer 407. Subsequently, as illustrated in FIG. 4B, the material (a) 201 was cured with irradiation with a high-pressure mercury lamp (EXECURE250 manufactured by HOYA CANDEO OPTRONICS Corporation) from above the glass substrate 406 under conditions of 20 mW/cm² for 1000 sec. After curing, as illustrated in FIG. 4C, a laminated diffractive optical element 501 having closely attached diffractive gratings including the materials (a) 201 and (b) 301 integrated with the glass substrates 404 and 406 was produced.

A method for evaluating characteristics of the materials (a) 201 and (b) 301 is described as follows.

[A Method for Evaluating Refractive Index]

An evaluation sample was made for measuring refractive index as follows.

Figure 5A:
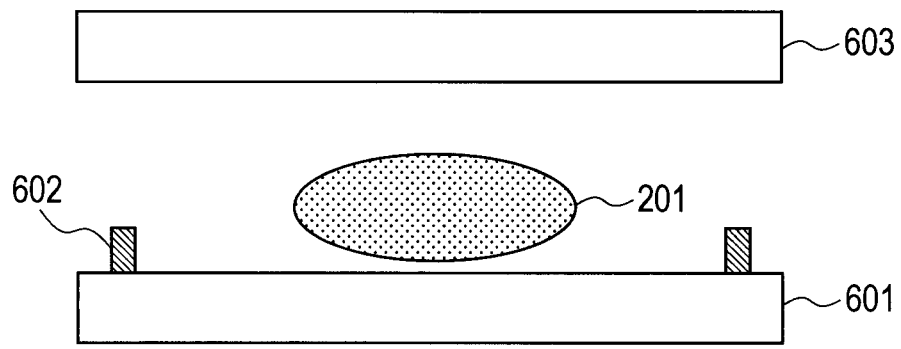
FIGS. 5A, 5B, and 5C are cross-sectional views illustrating a method for making a specimen for evaluating refractive index.
Figure 5B:
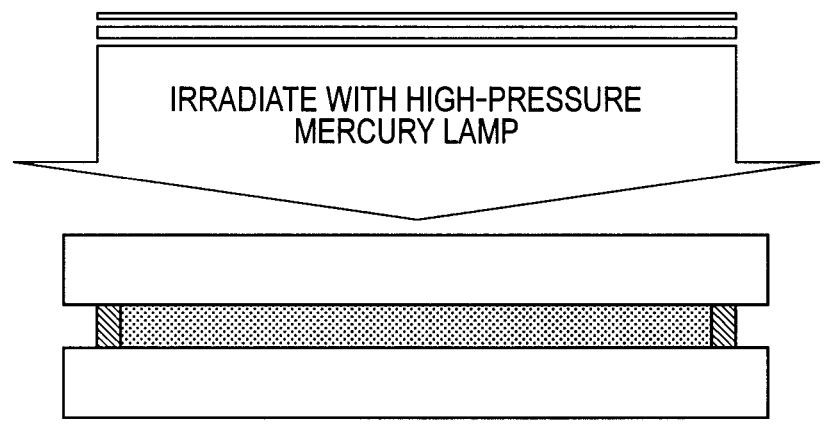
Figure 5C:
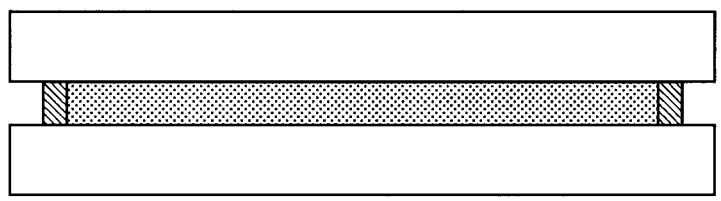

As illustrated in FIG. 5A, a spacer 602 having a thickness of 12.5 μm and the material (a) 201 were disposed on a high refractive glass 601 (nd=1.78) having a thickness of 1 mm. A synthetic quartz 603 having a thickness of 1 mm was placed thereon with the spacer 602, and the material (a) 201 was flattened out. Subsequently, as illustrated in FIG. 5B, the material (a) 201 was cured into an evaluation sample as illustrated in FIG. 5C with irradiation with a high-pressure mercury lamp (EXECURE250 manufactured by HOYA CANDEO OPTRONICS Corporation) from above the synthetic quartz 603 under conditions of 20 mW/cm² for 1000 sec.

Refractive indices at the g-line (435.8 nm), F-line (486.1 nm), e-line (546.1 nm), d-line (587.6 nm), and C-line (656.3 nm) of the evaluation sample were measured with a refractometer (KPR-30 manufactured by Shimadzu Corporation). Abbe number (νd) and secondary dispersion characteristic (θg, F) were calculated from the measured refractive indices.

In Table 1, refractive index nd at the d-line, Abbe number (νd), and secondary dispersion characteristic (θg, F) are described as refractive index characteristics.

The same procedure was applied to the material (b) 301, and the results are described in Table 1.

[A Method for Evaluating Internal Transmittances $T_{\lambda,a}$ and $T_{\lambda,b}$]

An evaluation sample was made for measuring internal transmittance as follows.

Figure 6A:
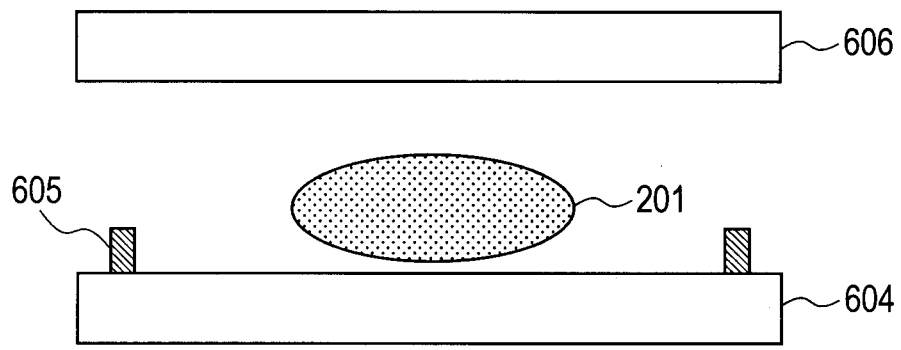
FIGS. 6A, 6B, and 6C are cross-sectional views illustrating a method for making a specimen for evaluating internal transmittance.
Figure 6B:
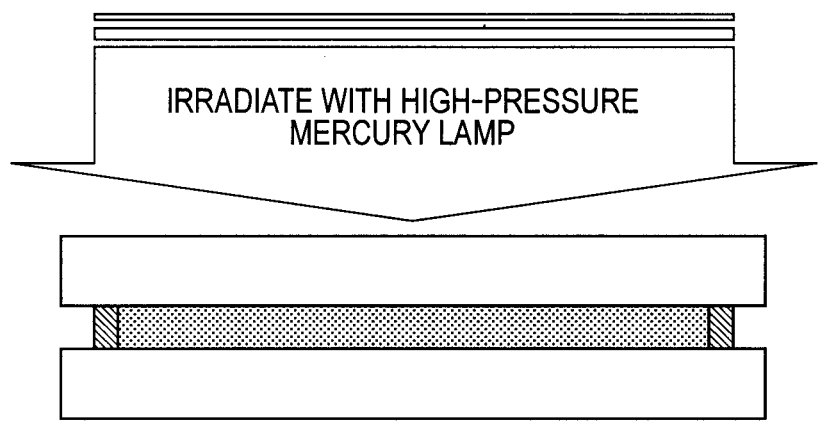
Figure 6C:
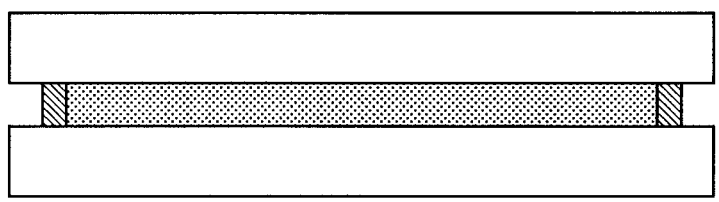

As illustrated in FIG. 6A, a spacer 605 having a thickness of 12.5 μm and the material (a) 201 were disposed on a BK glass 604 having a thickness of 1 mm. A BK glass 606 having a thickness of 1 mm was placed thereon, and the material (a) 201 was flattened out. Subsequently, as illustrated in FIG. 6B, the material (a) 201 was cured into an evaluation sample as illustrated in FIG. 6C with irradiation with a high-pressure mercury lamp (EXECURE250 manufactured by HOYA CANDEO OPTRONICS Corporation) from above the BK glass 606 under conditions of 20 mW/cm² for 1000 sec.

Transmittance of the evaluation sample was measured in the wavelength range from 450 nm to 650 nm with a spectrophotometer (U4000 manufactured by Hitachi, Ltd.), and from the measured value the internal transmittance $T_{\lambda,a}$ corresponding to the thickness of grating height X was calculated with consideration for reflectance of BK glasses 604 and 606.

The same procedure was applied to the material (b) 301 to calculate the internal transmittance $T_{\lambda,b}$.

In Table 1, representative values of difference in internal transmittance between the materials (a) 201 and (b) 301 $|T_{\lambda,a} - T_{\lambda,b}|$ are described at each of the wavelength of 450 nm, 550 nm, and 650 nm. In addition, the results of evaluation of whether Formula 1 is satisfied or not are represented as "satisfied" or "unsatisfied".

[A Method for Evaluating Internal Transmittances $T_{\lambda,MAX}$ and $T_{\lambda,MIN}$]

The internal transmittances $T_{\lambda,MAX}$ and $T_{\lambda,MIN}$ of the laminated diffractive optical element 501 were calculated based on the evaluation results on the internal transmittances $T_{\lambda,a}$ and $T_{\lambda,b}$ and the base thickness P.

In Table 1, representative values of difference in internal transmittance $T_{\lambda,MAX} - T_{\lambda,MIN}$ of the laminated diffractive optical element 501 are described at each of the wavelength of 450 nm, 550 nm, and 650 nm. In addition, the results of evaluation of whether Formula 2 is satisfied or not are represented as "satisfied" or "unsatisfied".

[A Method for Evaluating Diffraction Efficiency]

Diffraction efficiency was measured as follows.

Diffraction efficiency is the transmittance of the laminated diffractive optical element 501 irradiated with an amount of light in the design order of the diffraction grating.

It was confirmed that the laminated diffractive optical element 501 had a diffraction efficiency of 99.8% or more in the wavelength range from 400 nm to 650 nm. The results are described in Table 1.

[A Method for Evaluating Variation in Transmittance]

The laminated diffractive optical element 501 was incorporated into an imaging optical system for evaluation of variation in transmittance. For the case where the variation in transmittance depending on the diffraction grating shape was not confirmed on an image surface rating "good" was given, while for the case where the variation was confirmed rating "poor" was given. The results are described in Table 1.

Examples 2 to 5

In Examples 2 to 5, in manufacturing of the material (a), slurry was compounded into one of 5.4, 0.0, 20.0, and 10.1 vol % ZrO$_2$ fine particles relative to the resin volume in comparison to Example 1. Each of the materials (a) 202 to 205 was produced as in Example 1 except that one of 0.19, 0.12, 0.15, and 0.08 wt % Sumipast Black HB was compounded relative to the total weight of the resin and the ZrO$_2$ fine particles and one of 0.24, 0.15, 0.18, and 0.10 wt % SDO-13 was compounded relative to the total weight of the resin and the ZrO$_2$ fine particles.

In Examples 2 to 5, in manufacturing of the material (b), each of the materials (b) 302 to 305 was produced as in Example 1 except for the alteration to one of 15.0 and 7.5 vol % ITO fine particles relative to the resin volume in comparison to Example 1 and the alteration from a photocurable fluorine-containing acrylic resin to a photocurable acrylic resin in Examples 4 and 5.

In Examples 2 to 5, in manufacturing of the laminated diffractive optical element, the grating height X was designed based on refractive index characteristics of the materials (a) 202 to 205 and the materials (b) 302 to 305 so that each of the diffraction efficiency achieves 99.8% or more in the entire wavelength range from 400 nm to 650 nm to produce laminated diffractive optical elements 502 to 505. The designed grating heights of the laminated diffractive optical elements 502 to 505 were 11.02, 21.39, 12.02, and 23.82 μm, respectively.

The other evaluations were performed as in Example 1. The results are described in Table 1.

Comparative Examples 1 to 5

In Comparative Examples 1 to 5, in manufacturing of the material (a), the materials (a) 206 to 210 were produced as in Examples 1 to 5 except that Sumipast Black HB and SDO-13 were not added.

In Comparative Examples 1 to 5, in manufacturing of the material (b), the materials (b) 301 to 305 produced in Examples 1 to 5 were used.

In Comparative Examples 1 to 5, in manufacturing of the laminated diffractive optical element, grating height X was designed based on refractive index characteristics of the materials (a) 206 to 210 and the materials (b) 301 to 305 so that each of the diffraction efficiency achieves 99.8% or more in the entire wavelength range from 400 nm to 650 nm to produce laminated diffractive optical elements 506 to 510. The designed grating heights of the laminated diffractive optical elements 506 to 510 were 7.01, 11.02, 21.39, 12.02, and 23.82 μm, respectively.

The other evaluations were performed as in Example 1. The results are described in Table 1.

TABLE 1

| | | | | Example 1 | Example 2 | Example 3 | Example 4 | Example 5 | Comparative Example 1 |
|---|---|---|---|---|---|---|---|---|---|
| Material a | High refractive index, low dispersion layer | Material | | Material a201 | Material a202 | Material a203 | Material a204 | Material a205 | Material a206 |
| | | Refractive index characteristics | nd | 1.6267 | 1.55 | 1.4886 | 1.6153 | 1.5708 | 1.6264 |
| | | | vd | 44.2 | 49.1 | 53.9 | 44.8 | 47.5 | 44.3 |
| | | | θg, F | 0.6 | 0.58 | 0.57 | 0.6 | 0.58 | 0.6 |
| | | Colorant | | | | Present | | | Absent |
| Material b | Low refractive index, high dispersion layer | Material | | Material b301 | Material b302 | Material b303 | Material b304 | Material b305 | Material b301 |
| | | ITO content (vol %) | | 25 | 15 | 7.5 | 15 | 7.5 | 25 |
| | | Refractive index characteristics | nd | 1.5434 | 1.497 | 1.4613 | 1.5667 | 1.5463 | 1.5434 |
| | | | vd | 13.8 | 18.4 | 26.9 | 20 | 28.1 | 13.8 |
| | | | θg, F | 0.38 | 0.4 | 0.43 | 0.42 | 0.46 | 0.38 |
| Difference in internal transmittance between materials (a) and (b): $|T_{\lambda,a} - T_{\lambda,b}|$ (%)* | | Wavelength (nm) | 450 | 3.6 | 3.4 | 3.2 | 2.7 | 2.5 | 13.3 |
| | | | 550 | 0.5 | 0.5 | 0.5 | 0.6 | 0.3 | 12.3 |
| | | | 650 | 0.9 | 0.8 | 0.8 | 1 | 0.7 | 17.4 |
| (Formula 1): $2.0 \leq |T_{\lambda,a} - T_{\lambda,b}|$ (%)* | | | | Satisfied | Satisfied | Satisfied | Satisfied | Satisfied | Satisfied |
| Difference in internal transmittance of laminated diffractive optical element: $T_{\lambda,MAX} - T_{\lambda,MIN}$ (%)* | | Wavelength (nm) | 450 | 3.3 | 3.3 | 3.1 | 2.6 | 2.5 | 12.7 |
| | | | 550 | 0.5 | 0.5 | 0.5 | 0.5 | 0.3 | 11.9 |
| | | | 650 | 0.8 | 0.8 | 0.8 | 0.9 | 0.7 | 16.4 |

TABLE 1-continued

| | | | | | | | | |
|---|---|---|---|---|---|---|---|---|
| (Formula 2) $T_{\lambda, MAX} - T_{\lambda, MIN} \leq 8.0$ (%)* | | | Satisfied | Satisfied | Satisfied | Satisfied | Satisfied | Unsatisfied |
| Laminated diffractive optical element | | | 501 | 502 | 503 | 504 | 505 | 506 |
| Grating height (mm) | | | 7.01 | 11.02 | 21.39 | 12.02 | 23.82 | 7.01 |
| Diffraction efficiency (%) | | | | | ≥99.8 | | | ≥99.8 |
| Variation in transmittance | | | | | Good | | | Poor |

| | | | | Comparative Example 2 | Comparative Example 3 | Comparative Example 4 | Comparative Example 5 |
|---|---|---|---|---|---|---|---|
| Material a | High refractive index, low dispersion layer | Material | | Material a207 | Material a208 | Material a209 | Material a210 |
| | | Refractive index characteristics | nd | 1.5499 | 1.4885 | 1.6151 | 1.5707 |
| | | | vd | 49.2 | 54 | 44.8 | 47.5 |
| | | | θg, F | 0.58 | 0.57 | 0.6 | 0.58 |
| | | Colorant | | | Absent | | |
| Material b | Low refractive index, high dispersion layer | Material | | Material b302 | Material b303 | Material b304 | Material b305 |
| | | ITO content (vol %) | | 15 | 7.5 | 15 | 7.5 |
| | | Refractive index characteristics | nd | 1.497 | 1.4613 | 1.5667 | 1.5463 |
| | | | vd | 18.4 | 26.9 | 20 | 28.1 |
| | | | θg, F | 0.4 | 0.43 | 0.42 | 0.46 |
| Difference in internal transmittance between materials (a) and (b): $|T_{\lambda, a} - T_{\lambda, b}|$ (%)* | | Wavelength (nm) | 450 | 12.6 | 12.1 | 13.5 | 11.6 |
| | | | 550 | 11.7 | 11.3 | 13.9 | 11.5 |
| | | | 650 | 16.4 | 16 | 19.2 | 11.7 |
| (Formula 1): $2.0 \leq |T_{\lambda, a} - T_{\lambda, b}|$ (%)* | | | | Satisfied | Satisfied | Satisfied | Satisfied |
| Difference in internal transmittance of laminated diffractive optical element: $T_{\lambda, MAX} - T_{\lambda, MIN}$ (%)* | | Wavelength (nm) | 450 | 12.3 | 11.9 | 13.2 | 11.5 |
| | | | 550 | 11.4 | 11.2 | 13.6 | 11.4 |
| | | | 650 | 15.9 | 15.6 | 18.5 | 16.5 |
| (Formula 2) $T_{\lambda, MAX} - T_{\lambda, MIN} \leq 8.0$ (%)* | | | | Unsatisfied | Unsatisfied | Unsatisfied | Unsatisfied |
| Laminated diffractive optical element | | | | 507 | 508 | 509 | 510 |
| Grating height (mm) | | | | 11.02 | 21.39 | 12.02 | 23.82 |
| Diffraction efficiency (%) | | | | | ≥99.8 | | |
| Variation in transmittance | | | | | Poor | | |

*Wavelength range: 450 nm ≤ λ ≤ 650 nm

It was confirmed that the materials (a) 201 to 205 and the materials (b) 301 to 305 that were produced in Examples 1 to 5 satisfied Formula 1, and the laminated diffractive optical elements 501 to 505 that were formed therefrom satisfied Formula 2. Occurrence of variation in transmittance was not confirmed.

In contrast, it was confirmed that although the materials (a) 206 to 210 produced in Comparative Examples 1 to 5 and the materials (b) 301 to 305 satisfied Formula 1, the laminated diffractive optical elements 506 to 510 that were formed therefrom did not satisfy Formula 2. And occurrence of variation in transmittance was confirmed.

The laminated diffractive optical elements that were produced in the present Examples had excellent resistance to light.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-257147, filed Nov. 17, 2010 which is hereby incorporated by reference herein in its entirety.

The invention claimed is:

1. A laminated diffractive optical element comprising:
a first layer having a diffraction grating surface with a grating height X; and
a second layer closely stacked on the diffraction grating surface of the first layer,
wherein where $T_{\lambda, a}$ is an internal transmittance of a material (a) that the first layer consists of, where the material has a thickness X, and $T_{\lambda, b}$ is an internal transmittance of a material (b) that the second layer consists of, where the material has a thickness X, each internal transmittance being an internal transmittance for at least one specific wavelength within the range of 450 nm ≤λ≤650 nm of a light beam with a wavelength λ, the following relationship is satisfied:

$$2.0\% \leq |T_{\lambda, a} - T_{\lambda, b}| \quad \text{(Formula 1)}$$

wherein where $T_{\lambda, MAX}$ is an internal transmittance of the element at a part where the transmittance reaches a maximum for a light beam with a wavelength λ within the range of 450 nm ≤λ≤650 nm, and $T_{\lambda, MIN}$ is an internal transmittance of the element at a part where the transmittance reaches a minimum for a light beam with a wavelength λ within the range of 450 nm ≤λ≤650 nm, the following relationship is satisfied:

$$T_{\lambda, MAX} - T_{\lambda, MIN} \leq 8.0\% \quad \text{(Formula 2), and}$$

wherein X satisfies the following relationship:
0.01 μm ≤X≤100 μm.

2. The laminated diffractive optical element according to claim 1, wherein the material (a) of the first layer comprises a colorant selected from the group consisting of dye compounds and pigments.

3. The laminated diffractive optical element according to claim 1, wherein both or either one of the materials (a) and (b) comprises an organic-inorganic composite, the composite comprising a resin and metal oxide fine particles.

4. The laminated diffractive optical element according to claim 3, wherein the metal oxide fine particles are selected from the group consisting of tin-doped indium oxide (ITO), antimony-doped tin oxide (ATO), zinc-doped indium oxide (IZO), aluminum-doped zinc oxide (AZO), and fluorine-doped tin oxide (FTO).

5. The laminated diffractive optical element according to claim 3, wherein the metal oxide fine particles have an average primary particle diameter in the range of 2 nm or more and 30 nm or less.

6. The laminated diffractive optical element according to claim 3, wherein the content of the metal oxide fine particles is in the range of 0.5 vol % or more and 40 vol % or less relative to the resin.

7. The laminated diffractive optical element according to claim 1, wherein the material (a) of the first layer comprises a dye compound.

8. The laminated diffractive optical element according to claim 1, wherein the material (a) of the first layer comprises a dye compound and zirconia particles, and
wherein the material (b) of the second layer comprises an organic-inorganic composite comprising a resin and metal oxide fine particles, the metal oxide fine particles being selected from the group consisting of tin-doped indium oxide (ITO), antimony-doped tin oxide (ATO), zinc-doped indium oxide (IZO), aluminum-doped zinc oxide (AZO), and fluorine-doped tin oxide (FTO).

9. A laminated diffractive optical element comprising:
a first layer having a diffraction grating surface with a grating height X and being formed of a first material;
a second layer stacked on the diffraction grating surface of the first layer and being formed of a second material,
wherein for at least one specific wavelength $\lambda$ that satisfies 450 nm $\leq \lambda \leq$ 650 nm, the following conditions are satisfied:

$$2.0\% \leq |T_{\lambda,a} - T_{\lambda,b}|$$

$$T_{\lambda,MAX} - T_{\lambda,MIN} \leq 8.0\%$$

$$1\ \mu m \leq X \leq 30\ \mu m,$$

where
$T_{\lambda,a}$ is an internal transmittance of the first material having thickness X in the first layer,
$T_{\lambda,b}$ is an internal transmittance of the second material having thickness X in the second layer,
$T_{\lambda,Max}$ is an internal transmittance of the element at a part where the transmittance reaches a maximum for a light beam with a wavelength $\lambda$, and
$T_{\lambda,MIN}$ is an internal transmittance of the element at a part where the transmittance reaches a minimum for a light beam with a wavelength $\lambda$.

10. The laminated diffractive optical element according to claim 9, wherein the diffraction grating surface has a pitch Y satisfying 1 $\mu m \leq Y \leq$ 2000 $\mu m$,
wherein the diffraction grating surface has a surface roughness Ra of 0.01 nm or more and 100 nm or less,
wherein the first material comprises a dye compound and zirconia particles, and
wherein the second material comprises a resin and metal oxide fine particles, the metal oxide fine particles being selected from the group consisting of tin-doped indium oxide (ITO), antimony-doped tin oxide (ATO), zinc-doped indium oxide (IZO), aluminum-doped zinc oxide (AZO), and fluorine-doped tin oxide (FTO).

11. The laminated diffractive optical element according to claim 10, wherein the first material's dye compound is present in an amount of 0.01 wt % to 5.0 wt % relative to resins, organic-inorganic composites, and inorganic materials of the first material, and
wherein the second material's metal oxide fine particles are present in a range of 0.5 vol % or more and 25 vol % or less relative to the second material's resin.

12. The laminated diffractive optical element according to claim 11, wherein the first material further comprises acrylic resin,
wherein the first material's zirconia particles comprise $ZrO_2$ fine particles,
wherein the second material's resin comprises acrylic resin, and
wherein the second material's metal oxide fine particles comprise ITO fine particles.

* * * * *